(Model.)

I. C. H. GILMORE.
COFFEE POT.

No. 270,415. Patented Jan. 9, 1883.

Witnesses:
N. E. Oliphant
Frankland Jannus

Inventor:
Isaac C. H. Gilmore,
per Chas. H. Fowler

UNITED STATES PATENT OFFICE.

ISAAC C. H. GILMORE, OF ROSENDALE, MISSOURI.

COFFEE-POT.

SPECIFICATION forming part of Letters Patent No. 270,415, dated January 9, 1883.

Application filed September 9, 1882. (Model.)

*To all whom it may concern:*

Be it known that I, ISAAC C. H. GILMORE, a citizen of the United States, residing at Rosendale, in the county of Andrew and State of Missouri, have invented certain new and useful Improvements in Coffee-Pots, Tea-Pots, and other like Vessels; and I do hereby declare that the following is a full, clear, and exact description of the same, reference being had to the accompanying drawings, in which—

Figure 2:
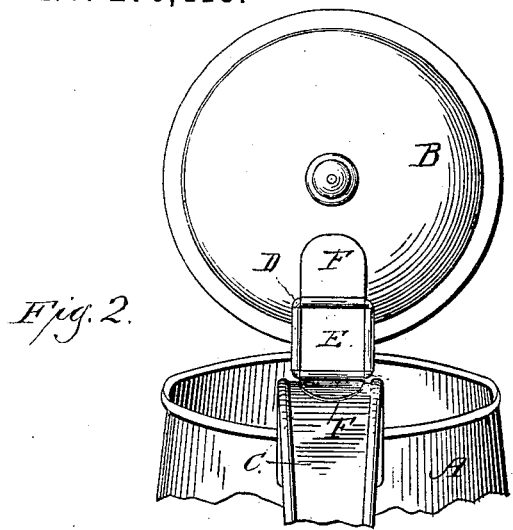
Figure 1:
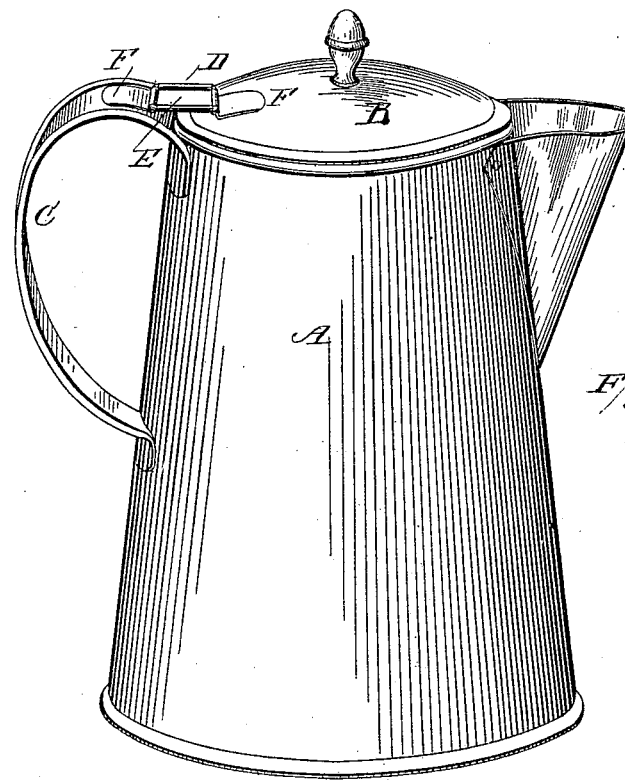

Figure 1 is a perspective view, showing the cover of a coffee-pot in a raised position; Fig. 2, a perspective view of a coffee-pot with the cover closed, and Fig. 3 a detail view of the compound hinge.

The present invention has relation to certain new and useful improvements in the manner of attaching the covers of coffee or tea pots and other like vessels, and particularly refers to that class in which a compound hinge is used.

Previous to my invention the compound hinge was usually connected to the interior of the vessel and the interior or under side of the cover, thus exposing the hinge to the contents of the vessel, and, especially in coffee or tea pots, the coffee or tea grounds would settle in the joint of the hinge and collect and retain the moisture arising from the heated contents in the shape of steam, and as there was no chance for it to dry out the hinge would invariably rust and come off by the leverage which the cover or lid has on it.

The object of the invention is to remove the above-mentioned difficulties; and it consists in the details of construction of the hinge and the manner of attachment to the cover and handle of the vessel, as will be hereinafter more fully described, and subsequently pointed out in the claim.

Figure 3:
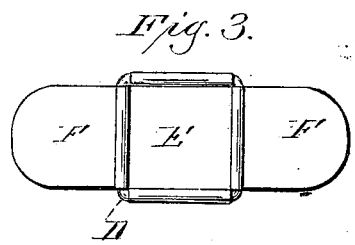

In the accompanying drawings, A represents a coffee-pot or other vessel having the usual cover or lid, B, and handle C, said cover being connected by a compound hinge, as represented in Fig. 3. This hinge I construct in the following manner: In place of having two separate sections of wire and securing them respectively to the cover and body of the vessel, I take a single piece of wire and bend it in a square or rectangular shape, thus forming a frame, D, of a continuous piece of wire. To the sides of the wire frame D is secured a strengthening metal plate, E, to hold the wire rigid and prevent it from bending or twisting out of shape, thus forming a strong and simple body to the hinge and avoiding the necessity of using two pieces of wire, as stated. The two opposite sides of the frame D form the axis of the hinge, and have loosely connected thereto the leaves F, of sufficient length to be secured to the outer side of the lid or cover B and top of the handle C.

By connecting the hinge to the handle instead of to the body of the vessel the lid or cover can be swung back entirely clear of the vessel A and out of the way, which could not well be done where the hinge is secured to the interior of the vessel, thus enabling the vessel to be more easily and readily cleaned.

As will be seen, the hinge is upon the outside of the vessel and cover or lid, and not exposed to the contents of the vessel, which would tend to corrode it and render it inoperative, while at the same time the peculiar construction of the hinge, in addition to the manner of attachment, enables it to work more easily.

Having now fully described my invention, what I claim as new, and desire to secure by Letters Patent, is—

A compound hinge consisting of the continuous wire frame D, having secured thereto a strengthening-plate, E, and leaves F, said leaves being secured to the handle of the vessel and to its cover, substantially as and for the purpose specified.

ISAAC C. H. GILMORE.

Witnesses:
JOHN B. MAJORS,
WILLIAM D. BLAKEWAY.